UNITED STATES PATENT OFFICE.

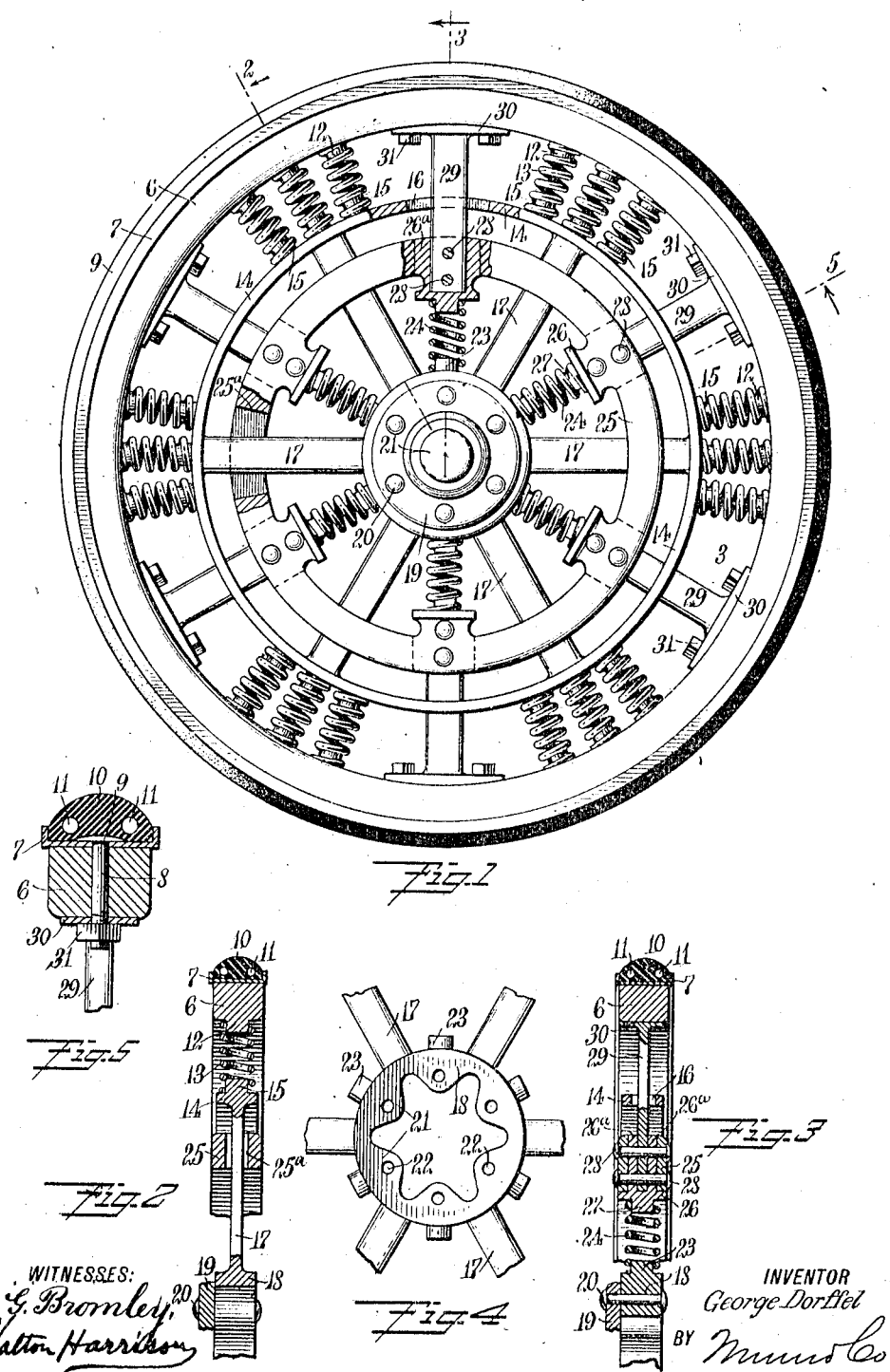

GEORGE DORFFEL, OF OAKLAND, CALIFORNIA.

SPRING-WHEEL.

1,035,556.  Specification of Letters Patent.  Patented Aug. 13, 1912.

Application filed September 14, 1910. Serial No. 582,011.

*To all whom it may concern:*

Be it known that I, GEORGE DORFFEL, a citizen of the United States, and a resident of Oakland, in the county of Alameda and State of California, have invented a new and Improved Spring-Wheel, of which the following is a full, clear, and exact description.

My invention relates to spring wheels, my more particular purpose being to provide a strong and durable construction offering a minimum of friction and having few pieces liable to get out of order.

My invention further relates to various details of wheel construction adapted for improving the general efficiency of wheels of this character.

Reference is to be had to the accompanying drawings forming a part of this specification, in which similar characters of reference indicate corresponding parts in all the figures.

Figure 1 is a side elevation, with parts broken away, showing the wheel complete; Fig. 2 is a fragmentary section on the line 2 of Fig. 1, looking in the direction of the arrow; Fig. 3 is a section on the line 3 of Fig. 1, looking in the direction of the arrow; Fig. 4 is a detail showing in fragmentary elevation a part of the hub frame; and Fig. 5 is an enlarged fragmentary section on the line 5 of Fig. 1.

My improved spring wheel is of the general type employing two elements, one movable relatively to the other, and one of these elements comprising a hub and a bearing ring rigid relatively to each other and spaced concentrically apart; the other element comprising two annular members concentric to each other and also spaced apart and acting as a unit, and spring connections of various kinds from one of these elements to the other.

At 6 is an annular member having generally the office of a felly. It carries upon its outer peripheral surface a rim 7 which is connected with the annular member 6 by aid of bolts 8 having wide flat heads 9 and extending through the center of the rim and felly.

At 10 is a tire made preferably of rubber and provided with two annular passages 11, being thus practically a double-cushioned tire.

The felly 6 is provided with a number of buttons 12 extending radially inward and arranged in groups, there being three buttons in each group. I prefer to use six groups, but the precise number is immaterial. Encircling the buttons 12 are spiral springs 13 which extend radially inward and engage a ring 14 of metal. This ring is provided with buttons 15 extending radially outward and encircled by the adjacent ends of the spiral spring 13. The ring 14 is provided with slots 16 extending in the general direction of the plane of the ring. A number of spokes 17 are secured rigidly to the ring 14 and extend radially inward from the same, these spokes at their inner ends being connected with a substantially annular hub frame 18 of the form shown in Fig. 4.

At 19 is a hub plate which is connected with the hub frame 18 by aid of rivets 20. To give these rivets a good bearing where they extend through the annular hub frame 18 the latter is provided internally with thickened portions 21, having holes 22 entirely through them. The hub frame 18 is provided with buttons 23 extending radially outward from it, these buttons being alternated with the inner spokes 17, as will be understood from Fig. 4. The buttons 23 are encircled by spiral springs 24 and adjacent to the springs 24 is a ring 25. The ring 25 is provided with recesses 25$^a$, through which the inner spokes 17 extend loosely. This ring carries a number of shoes 26, each shoe being provided with a button 27. Each shoe 26 is further provided two walls 26$^a$ of the form shown in Figs. 1 and 3, and between these walls is a recess for receiving the inner end of the adjacent spoke 29. Rivets 28 extend through the ring 25 and through the walls 26$^a$. The rivets 28 also extend through spokes 29, the adjacent ends of these spokes being sandwiched between the walls 26$^a$ and held fast by the rivets, as will be understood from Fig. 3. Each spoke 29 is provided at its outer end with a foot 30, this foot being engaged by a pair of nuts 31 which are revolubly mounted upon the bolts 8 and clamp the foot firmly against the inner surface of the ring 6 corresponding to the felly.

The rings 6 and 25 are, by virtue of the outer spokes 29, always rigid relatively to each other. The ring 14 and the hub frame 18 are, because of the action of the inner spokes 17 likewise rigid relatively to each other. The inner ring 14 and the hub frame 110 considered together, however, are as a unit movable relatively to the ring 6 and the ring 25, these two last-mentioned elements being rigid relatively to each other and acting as a unit.

The metallic parts are made preferably of aluminum or of the commercial preparation sometimes designated as "macadamite aluminum". They may, however, be constructed of any light metal or alloy suitable for the purpose.

I do not limit myself to the precise construction and arrangement of the parts above described, the scope of my invention being commensurate with my claims.

Having thus described my invention, I claim as new and desire to secure by Letters Patent:

1. In a spring wheel, the combination of an annular member serving as a felly, a plurality of spokes each provided with a foot rigid relatively thereto, the several feet engaging the inner surface of said felly, each spoke having a flattened inner end, bolts extending through said feet and into said felly for the purpose of holding said spokes rigid relatively to said felly, an annular member disposed concentrically within said felly, shoes mounted upon said annular member and provided with wide slots for receiving said flattened ends of said spokes, rivets extending through said shoes and through said flattened ends of said spokes, said shoes being provided with buttons extending radially inward toward the center of the wheel, a hub frame disposed within the approximate center of said felly and provided with buttons extending radially outward and mating said first-mentioned buttons, springs extending from said buttons carried by said shoes to said buttons carried by said hub frame, a ring encircling said hub frame and concentric thereto, rigid connections from said hub frame to said last mentioned ring, and spring connections from said last-mentioned ring to said felly.

2. In a spring wheel, the combination of an annular felly, a ring disposed concentrically within said felly, and provided with spaced slots, springs connecting said ring with said felly, a second ring disposed concentrically within the first ring, shoes carried by said second ring and provided with recesses, the said second ring being provided with slots located between the shoes, spokes connected rigidly at their outer ends with said felly, the said spokes extending through the slots in the first mentioned ring and secured at their inner ends in the recesses in said shoes of the second ring, a hub frame, spring connections between the hub frame and the said shoes of the second ring, and spokes mounted rigidly upon the said hub frame between the said spring connections, the said spokes passing through the slots in the second ring and secured at their outer ends to the first mentioned ring.

In testimony whereof I have signed my name to this specification in the presence of two subscribing witnesses.

GEORGE DORFFEL.

Witnesses:
 EDWARD M. SHAW,
 HENRY H. SHED.